United States Patent
Leucci

[15] 3,674,016
[45] July 4, 1972

[54] SHIELD FOR ENDOSCOPIC INSTRUMENTS

[72] Inventor: Gino Leucci, 4740 Castor Ave., Philadelphia, Pa. 19124

[22] Filed: June 25, 1970

[21] Appl. No.: 49,756

[52] U.S. Cl............................................128/4, 128/7, 350/60, 350/65
[51] Int. Cl. ..........................................................A61b 1/00
[58] Field of Search ......................128/3, 4, 5, 6, 7, 8, 9, 10, 128/11; 350/57, 60, 65

[56] References Cited

UNITED STATES PATENTS

| | | | |
|---|---|---|---|
| 849,409 | 4/1907 | Martin | 350/57 |
| 2,522,897 | 9/1950 | Rotter | 350/65 X |
| 3,399,011 | 8/1968 | Heiniger | 350/60 |

*Primary Examiner*—Lucie H. Laudenslager
*Attorney*—Ostrolenk, Faber, Gerb & Soffen

[57] ABSTRACT

A shield for endoscopic instruments id described. Endoscopic instruments have an elongated, hollow member that has a front end adapted for insertion into the bladder through the urethra, and a back end having an opening that is adapted for receiving a viewing instrument. The shield is typically mounted at the back end of the endoscopic instrument such that it is in a non-interfering position when the viewing instrument is in place in the endoscopic instrument. When the viewing instrument is removed from the endoscopic instrument, the shield pivots to a protectively disposed position behind the opening at the back of the endoscopic instrument to deflect liquid that is ejected out through said opening.

4 Claims, 4 Drawing Figures

PATENTED JUL 4 1972  3,674,016

INVENTOR.
GINO LEUCCI
BY
Ostrolenk, Faber, Gerb & Soffen
ATTORNEYS

SHIELD FOR ENDOSCOPIC INSTRUMENTS

The invention relates to a shield for endoscopic instruments.

Endoscopic instruments such as cystoscopes, panendoscopes, and resectoscopes are adapted for insertion into the bladder through the urethra. An endoscopic instrument has a cavity running its entire length, the cavity being adapted for receiving a viewing instrument or telescope in the back end of said endoscopic instrument. The cavity is also used for filling the bladder with water, and for emptying the bladder of liquid contained therein. When using endoscopic instruments, it is necessary to fill the bladder with liquid to expand it to give room to work, in order to be able to see better, in order to inject medication into the bladder, and the like. The cavity running the entire length of the endoscopic instrument is used both to fill the bladder with liquid and to empty the bladder. This cavity is also adapted at the back end of the endoscopic instrument for receiving the above-mentioned telescope or viewing instrument. Normally, when the telescope is removed, the liquid is forcefully ejected out through the cavity, and can easily splash the physician operating the instrument. This is clearly undesirable.

This invention provides a relatively inexpensive shield that can be used to deflect this stream of water or other liquid so that when the liquid jets out through the cavity inside the endoscope, it is deflected by the shield downwardly and can be received in a container. A desirable feature of this shield is that it is in a non-interfering position while the endoscopic instrument is being used to view the inside of the bladder or for other purposes.

Figure 1:
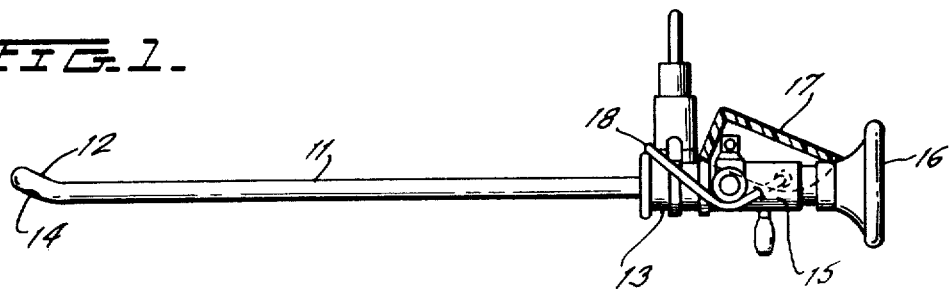
FIG. 1 is a side view of a cystoscope showing the pivotally mounted shield in a non-interfering position while a viewing instrument is in place in the cystoscope.
Figure 2:
FIG. 2 is a side view of a cystoscope showing the pivotally mounted shield in a deflecting position after the viewing instrument has been removed.
Figure 3:
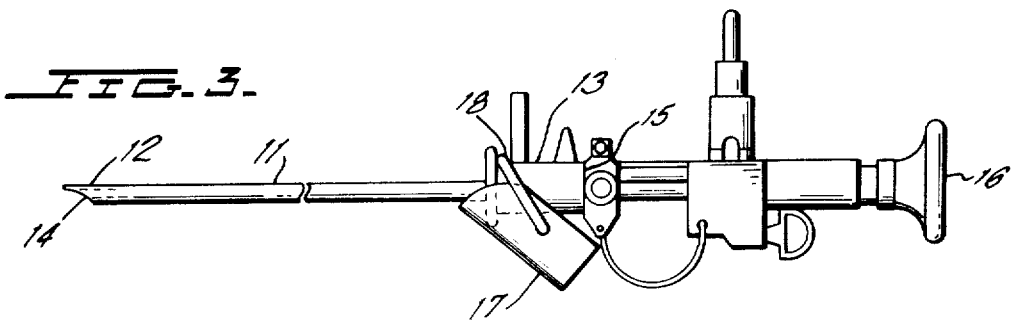
FIG. 3 is a side view of a resectoscope showing the shield in a non-interfering position while the viewing instrument is in place in the resectoscope.
Figure 4:
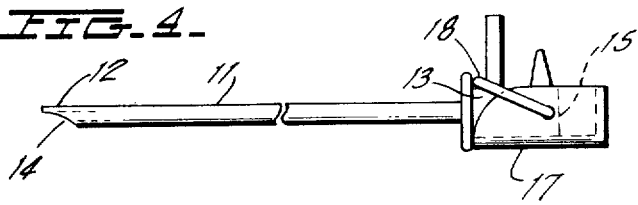
FIG. 4 is a side view of a resectoscope showing the shield in a protecting position after the viewing instrument has been removed from a resectoscope.

Referring now to FIGS. 1, 2, 3 and 4, wherein like numerals refer to like members, two versions of the invention are shown. In FIGS. 1 and 2, the novel shield of the invention is shown mounted on a cystoscope. In FIGS. 3 and 4, the shield of the invention is shown mounted on a resectoscope. Broadly speaking, endoscopic instruments contain an elongated member 11, the elongated member having a front end 12 that is adapted for insertion into the bladder through the urethra. The endoscopic instrument also has a back end 13 and a cavity (not shown) running substantially the entire length of the elongated member 11 from an opening 14 at said front end 12 to an opening 15 at said back end 13. The opening 15 at the back end 13 is adapted to receive a viewing instrument 16. Another type of instrument for performing an endoscopy is a panendoscope. For a transurethral resection, a resectoscope is used.

The cavity that is contained in the elongated member 11, in addition to being adapted for receiving a viewing instrument 16, is also used as a passageway for injecting liquid into the bladder and for removing liquid from the bladder. The liquid that is injected into the bladder creates an intravesicle pressure, so that when the liquid comes out through the cavity it comes out in a rather forceful jet. The purposes of the shield of this invention is to deflect this jet of liquid downwardly to make it more readily controllable and sanitary. In the Figures, the shield 17 is shown in FIGS. 1 and 3 in a non-interfering position while the telescope 16 is in place in the cavity contained in elongated member 11. Shield 17 is pivotally mounted so that when the viewing instruments are removed from said cavity, the shield automatically pivots down in front of the opening 15 at the back end 13 of the endoscopic instrument. The shield thereby deflects downwardly any liquid that is coming out of the cavity. A container can be provided under the end 13 of the endoscopic instrument in order to receive the liquid.

The pivotally mounted shield employed in this invention can be adapted for use on cystoscopes, panendoscopes, and resectoscopes. It can be mounted onto the instrument by means of an elastic band 18 that is attached to shield 17 such that when the viewing instrument 16 or other like instrument is removed from the cavity in the endoscopic instrument, the shield 17 is automatically pulled down in place in a protectively disposed position behind the opening 15 at the back end 13 of the endoscopic instrument.

The shield can be made of plastic, or of any other convenient, inexpensive material.

It will be apparent that the disclosure set forth above by way of illustration of the invention is not limiting in nature, and that various other forms of the shield can be employed without departing from the spirit of this invention.

The embodiments of the invention in which an exclusive privilege or property is claimed are defined as follows:

1. An endoscopic instrument comprising an elongated member, said elongated member having:
   a. a front end adapted for insertion into the bladder through the urethra,
   b. a back end having at least one projecting portion extending transverse to the length of the instrument,
   c. a cavity running substantially the entire length of said elongated member from an opening at said front end to an opening at said back end, the opening at said back end being adapted to receive a viewing instrument, and
   d. a shield having an end surface, said shield being pivotally mounted at said back end of said elongated member such that said shield is in a non-interfering position when said viewing instrument is in said cavity, and wherein said shield pivots to a position such that said deflecting surface is protectively disposed behind said opening at said back end when said viewing instrument is removed from said cavity
   e. said shield further comprising a sidewall having a substantially U-shaped cross-section; said end surface being integrally joined to one end of said sidewall;
   an elastic band having its free ends joined to said sidewalls so as to bridge the opening in said sidewall;
   said band encircling said instrument and said projection at the rearward end thereof to normally urge said sidewall to abut against the back end of said instrument whereby the curved configuration maintains said sidewall a spaced distance from the back end opening to permit escape of fluids even when said shield is moved over said back end.

2. The endoscopic instrument of claim 1, wherein said instrument is a cystoscope.

3. The endoscopic instrument of claim 1, wherein said instrument is a panendoscope.

4. The endoscopic instrument of claim 1, wherein said instrument is a resectoscope.

* * * * *